United States Patent [19]

Cirkel et al.

[11] Patent Number: 4,503,542
[45] Date of Patent: Mar. 5, 1985

[54] HIGH-ENERGY LASER OF THE TE-TYPE

[75] Inventors: Hans-Jürgen Cirkel; Willi Bette; Reinhard Müller, all of Erlangen, Fed. Rep. of Germany

[73] Assignee: Kraftwerk Union Aktiengesellschaft, Mülheim, Fed. Rep. of Germany

[21] Appl. No.: 394,682

[22] Filed: Jul. 2, 1982

[30] Foreign Application Priority Data

Jul. 3, 1981 [DE] Fed. Rep. of Germany ....... 3126375

[51] Int. Cl.³ ............................................ H01S 3/097
[52] U.S. Cl. ...................................... 372/58; 372/83; 372/86; 372/87
[58] Field of Search ........................ 372/86, 87, 83, 58

[56] References Cited

U.S. PATENT DOCUMENTS 4,365,337 12/1982 Cirkel et al. ........................... 372/87

OTHER PUBLICATIONS

Rebhan et al., "A High Power $N_2$-Laser of Long Pulse Duration", Appl. Phys. 23, No. 4, Dec. 1980, pp. 341–344.

Primary Examiner—James W. Davie
Attorney, Agent, or Firm—Herbert L. Lerner; Laurence A. Greenberg

[57] ABSTRACT

High-energy laser of the TE-type with excitation taking place by an arc-free capacitor discharge being as homogeneous as possible, including a housing having walls formed at least partially of high voltage-resistant insulating material defining a laser chamber having a gas space, at least two first and second electrodes being extended in the laser chamber and surrounded by regions of the housing walls, the electrodes being disposed opposite each other, spaced apart and parallel to the optical axis of the laser, the excitation taking place in the gas space between the electrodes, a preionization device disposed in the laser chamber, a current feed connected to the first electrode, a current return being connected to the second electrode and being in the form of metallic wall portions extended from the second electrode along the outside of the housing of the laser chamber at least to the vicinity of the region of the housing wall surrounding the first electrode, the insulating material of the housing in the gas space between the electrodes and the wall portions of the current return having cavities formed therein on two sides of the first electrode parallel to the optical axis, as seen in direction of the optical axis, and shield electrodes being inserted into the cavities and being connected to the potential of the first electrode.

9 Claims, 7 Drawing Figures

HIGH-ENERGY LASER OF THE TE-TYPE

The invention relates to a high-energy laser of the TE-type, with excitation by an arc-free capacitor discharge as homogeneous as possible in the gas space between at least two first and second electrodes which extend within a laser chamber parallel to the optical axis of the laser and are disposed opposite each other at a spacing, and which are disposed with a suitable preionization device within the housing of the laser chamber being formed at least partially of high voltage-resistant insulating material and being connected to a current feed or a current return, respectively, the current return being extended in the form of metallic wall portions from the second electrode along the housing shell of the laser chamber back to at least the vicinity of the housing wall region surrounding the first electrode.

Such a high-energy laser is known, for instance, from German Published, Non-Prosecuted Application DE-OS No. 29 32 781, corresponding to U.S. Pat. No. 4,365,337.

Such TE (transversely excited) lasers are required in inexpensive constructions and with high average radiation output for photochemical applications, especially in the industrial area. For the operation of these lasers, current rise rates which are as high as possible are necessary. These can be achieved by minimizing the inductances of the electric excitation circuit. This requirement leads to the construction of laser housings that are as compact as possible. However, because of this the danger of sliding surface sparks on the walls of the housing is heavily increased. First, the sliding sparks, which are caused by so-called tangential field components, subtract energy from the desired bulk discharge, and secondly degrade the quality of the laser gas due to surface reactions. Both effects adversely affect or even prevent the laser emission.

It is accordingly an object of the invention to provide a high-energy laser of the TE-type which overcomes the hereinbefore-mentioned disadvantages of the heretofore-known devices of this general type, and to do so in such a manner that parasitic slide discharges at its inside walls can be prevented, or practically prevented, in spite of its compact construction.

With the foregoing and other objects in view there is provided, in accordance with the invention, a high-energy laser of the TE-type with excitation taking place by an arc-free capacitor discharge being as homogeneous as possible, comprising a housing having walls formed at least partially of high voltage-resistant insulating material defining a laser chamber having a gas space, at least two first and second electrodes being extended in the laser chamber and surrounded by regions of the housing walls, the electrodes being disposed opposite each other, spaced apart and parallel to the optical axis of the laser, the excitation taking place in the gas space between the electrodes, a preionization device disposed in the laser chamber, a current feed connected to the first electrode, a current return being connected to the second electrode and being in the form of metallic wall portions extended from the second electrode along the outside of the housing of the laser chamber at least to the vicinity of the region of the housing wall surrounding the first electrode, the insulating material of the housing in the gas space between the electrode and the wall portions of the current return having cavities formed therein on two sides of the first electrode parallel to the optical axis, as seen in direction of the optical axis, and shield electrodes being inserted into the cavities and being connected to the potential of the first electrode.

In accordance with another feature of the invention, the cavities extend beyond the depth of the shield electrodes in direction toward the region of the housing walls surrounding the second electrode.

In accordance with a further feature of the invention, the electrodes have bases disposed in the regions of the housing walls surrounding the respective electrodes, and the cavities extend from a location even with the base of the first electrode to a location even with the base of the second electrode.

In accordance with an added feature of the invention, the cavities have bottoms and the wall portions of the current return have surfaces facing the laser chamber having tray-shaped recesses formed therein extended from a zone in which the shield electrode ends overlap the recesses at least to the vinicity of the bottom of the cavities.

In accordance with an additional feature of the invention, the cavities are milling cuts or bore holes in the form of rows of closely adjacent drill holes, and the shield electrodes are in the form of a plurality of metal pins being electrically interconnected and inserted into the drill holes.

In accordance with again another feature of the invention, the cavities are in the form of a slot-shaped cavity, and the shield electrodes are in the form of sheet metal or a metal screen inserted into the slot-shaped cavity.

In accordance with again a further feature of the invention, the cavities are in the form of longitudinal slots formed in the housing, and the shield electrodes are in the form of wires being stretched taut parallel to the optical or electrode axis, the wires beind disposed in the longitudinal slots and being connected to the first electrode.

In accordance with again an added feature of the invention, the housing of the laser chamber and the current return have lateral window-shaped cutouts formed therein for permitting a laser gas flow transverse to the optical axis and forming remaining housing wall elements with a core in which the metallic current return is disposed, and including a first layer of insulating material surrounding the metallic current return in the core, the first insulating layer being enclosed by the shield electrodes, and a second layer of insulating material encapsulating the shield electrodes.

In accordance with a concomitant feature of the invention, the electrodes have Chang or Rogowski profile envelopes with surface regions having a plurality of rounded longitudinal slots formed therein in lengthwise direction and elongated profile humps remaining between the slots within the profile envelope.

The advantages achieved with the invention are in particular that a very low-inductance, compact high-energy laser has been created which operates completely, or very largely, free of sliding sparks, so that its losses are very small and the quality of the laser gas is maintained longer.

Other features which are considered as characteristic for the invention are set forth in the appended claims.

Although the invention is illustrated and described herein as embodied in a high-energy laser of the TE-type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
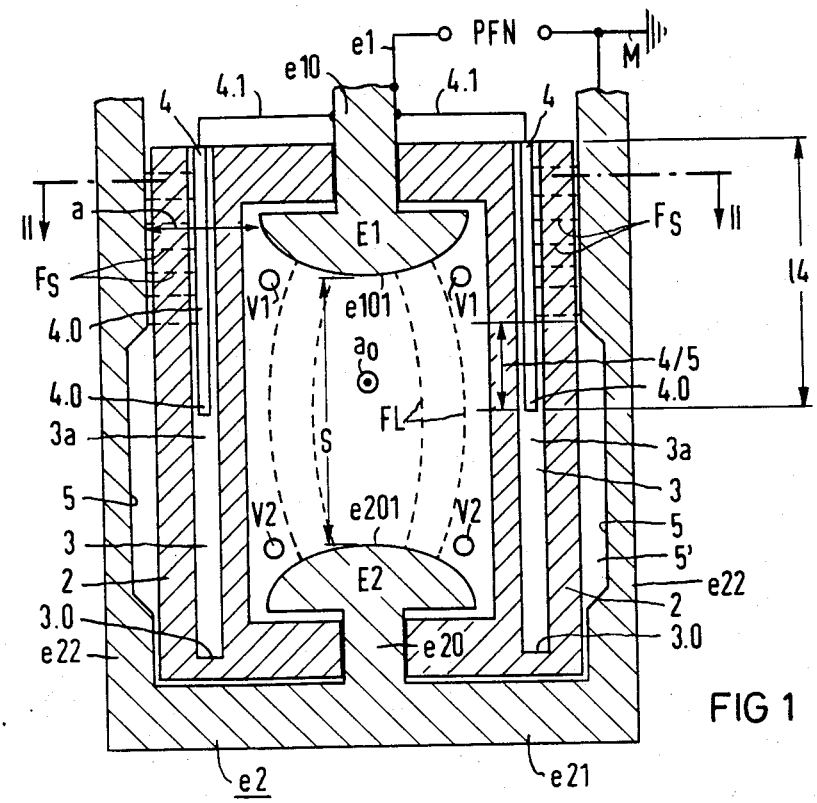
FIG. 1 is a fragmentary, diagrammatic, cross-sectional view taken through a laser chamber.

Referring now to the figures of the drawing which show four embodiments but omit parts that are not required for an understanding of the invention, and first particularly to FIG. 1 thereof, there is seen a high-energy laser of the TE-type. The laser chamber 1 is filled with laser gas and thus forms a gas space in which the laser emission is excited by an arc-free capacitor discharge, being as homogeneous as possible between two electrodes E1 and E2. The two laser electrodes E1, E2 extend parallel to the optical axis $a_0$ of the laser and are disposed opposite each other with a spacing therebetween, the shortest distance S being the gap length. The laser housing 2 should be visualized as an elongated rectangular housing; in principle, however, other housing shapes are also conceivable, such as with elliptical or circular cross sections.

The housing 2 of the laser chamber 1 is preferably formed of high purity $Al_2O_3$ ceramic or a suitable insulating plastic; metallic wall portions e21 and e22 of a current return e2 for the electrode E2 can also be considered as the outer part of the housing 2. The first laser electrode E1 is connected to one pole of a suitable pulse-forming network PFN which, operating in a Bluemlein circuit or as a charge transfer circuit, supplies the necessary high voltage pulses such as is described for instance, in U.S. Pat. No. 4,365,337, corresponding to German Published, Non-Prosecuted Application DE-OS No. 29 32 781. Preionization rods V1 which are disposed parallel to the axis and in the immediate vinicity of the first electrode E1, and preionization rods V2 which are disposed parallel to the axis and in the immediate vicinity of the second electrode E2, are also connected to the PFN. The circuit layout and the construction of such preionization rods are described in greater detail in U.S. application Ser. No. 303,167, now abandoned; a detailed explanation can therefore be dispensed with here. The electrodes E1 and E2 extend into the laser chamber with mushroom stems e10 and e20, serving as a current lead, and mushroom hats e101 and e201, respectively, serving for current distribution; they are inserted in a gastight manner into corresponding cutouts in the laser housing 1. It will be seen that the current returns e2 in the form of the metallic wall portions e21 (base plate) and e22 (two side walls) extend from the second electrode E2 along the shell of the housing 2 at least to the vicinity of the wall portion surrounding the first electrode E1. M is the ground connection for e2 and E2.

Immediately before the gas space is ignited, the electrode E2 and the current return e2 are at the same potential, while the electrode E1 is at a potential which is different therefrom. Therefore, an electric field $F_L$ is developed between the electrodes E1 and E2, which is determined, among other things, by the potential difference and the gap length S as well as by the shape of the electrodes. However, an electric field also exists between the electrodes E1 and the current return e2, e.g., particularly with respect to its side walls e22; the electric field can be calculated by the same potential difference and the distance "a" shown in FIG. 1, as well as by the dielectric constant of the insulating material. These two field domponents determine the resultant field in the vicinity of the electrode E1. If the distances S and "a" were to furthermore become comparable, a large part of the field lines would penetrate into the insulating material of the housing 2 and the discharge would be urged toward the insulating material (which would promote the development of sliding sparks on the insulating material), unless this is prevented by the sliding-spark protection to be described below. In addition, the invention avoids a substantial increase of the distance "a" (with the distance S being kept constant), because such a measure would lead to a harmful and therefore undesired increase of the inductance of the laser housing. According to the invention and as seen in the laser axis direction $a_0$, cavities 3 are instead formed on both sides of the first electrode E1 connected to the current lead, and extend parallel to its axis. The cavities extend in the space between the electrode E1 on one side and the side walls e22 of the current return e2 on the other side, in the insulating material of the housing shell 2. Shield electrodes 4 are inserted into the cavities 3. The shield electrodes 4 are metalically or capacitively connected to the electrode E1 (connection 4.1). In this manner the influence of the current return e2 on the field pattern in the area of the electrode E1 is reduced, and the electric field in the laser housing is substantially determined by the electrodes E1 and E2; outside the gas space, transverse fields $F_S$ are obtained between the electrodes 4 and the current return e2.

As can be seen, the cavities 3, starting at the housing wall portions surrounding the electrode E1 all the way to the housing wall portions surrounding the second electrode E2, extend deeper than the length 14 of the shield electrodes 4 in this direction. Because of these dimensions, reactions of the shield electrodes 4 to the field in the vicinity of the electrode E2 are largely prevented. It is particularly advantageous if, as shown, the cavities 3 extend from the level of the electrode base e10 of the first electrode E1 all the way to the level of the electrode base e20 of the second electrode E2. By the use of this measure, the wave impedance for sliding sparks at the surface of the insulating material is increased, which likewise counteracts the tendency toward forming sliding sparks.

Figure 2:
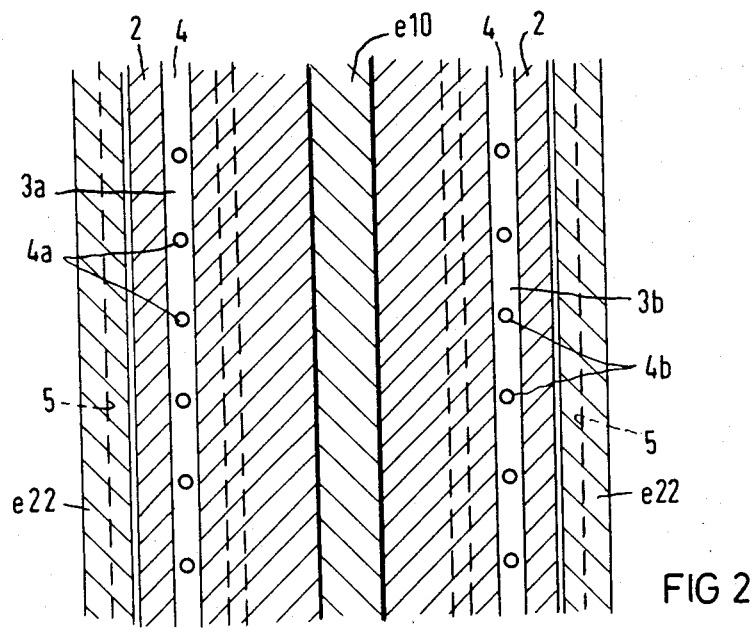
FIG. 2 is a fragmentary, cross-sectional view taken along the line II—II of FIG. 1, in the direction of the arrows.

A substantial increase of the wave impedance for sliding sparks can be achieved with only a slight increase of the inductance, by making tray-like recesses 5 in the side walls e22 of the current return e2, on their sides facing the laser chamber 1. The tray-like recesses 5 start at an overlap zone 4/5 formed with the free ends 4.0 of the shield electrodes 4, and extend at least to the vicinity of the bottom 3.0 of the cavities 3. Between the current return e2 and the housing 2 of insulating material there is formed a gas space 5' with a dielectric constant of nearly 1. In the embodiment example shown, the shield electrodes 4, as is better visible in FIG. 2, include a number of metal pins 4a and 4b, which are electrically connected to each other and are inserted into the cavities 3 that are formed as milling cuts 3a and 3b. Instead of the milling cuts 3a, 3b, corresponding drill holes could also be provided. Such holes are formed by a row of closely adjacent bore holes into which the metal pins of the shield electrodes must then be inserted.

Figure 5:
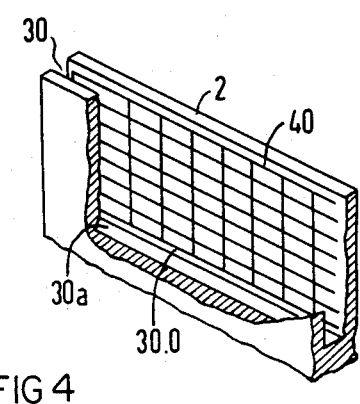
FIGS. 5 and 6 are views being partially broken away, of a shield electrode formed by wires or in the form of a screen.

FIG. 5 shows a fragmentary, perspective view in which a shield electrode 4 including a metal screen 40 is inserted into a slot-shaped cavity 30 of the housing 2 which is formed of insulating material. The slot bottom of this pocket or slot-shaped cavity is designated with reference symbol 30.0, and a space 30a without a shield electrode is again obtained due to the distance from the lower edge of the shield electrode to the slot bottom (the corresponding empty space is designated in FIG. 1 with reference symbol 3a). Instead of the metal screen 40, a piece of sheet metal could also be used.

Figure 6:
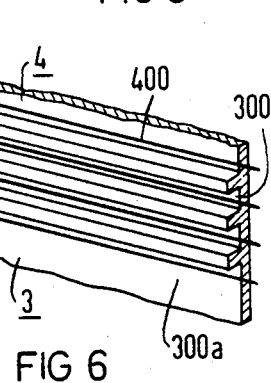

FIG. 6 likewise shows, in a perspective and fragmentary view, that the shield electrodes generally designated with reference symbol 4 are provided in the form of taut wires 400 which are stretched parallel to the axis of the laser and the electrodes and are placed in longitudinal slots 300 of the housing shell 3. The potential connection to the first electrode E1 is accomplished by cross connection surfaces 400.1 at the end face which are provided, for instance, in the form of narrow sheet metal strips and are placed in a corresponding crosswise alot 300.1 intersecting the longitudinal slots 300. The electrical connection between the surfaces 400.1 and the wires 400 can be accomplished, for instance, by pressure connections, inserting the bare ends of the wires 400 into corresponding holes in the strips 400.1, leaving a pushed-out edge and then squeezing embossings on. The empty space being free of shield electrodes is designated in this case with reference symbol 300a, and is formed by a corresponding slit below the slots 300.

Figure 3:
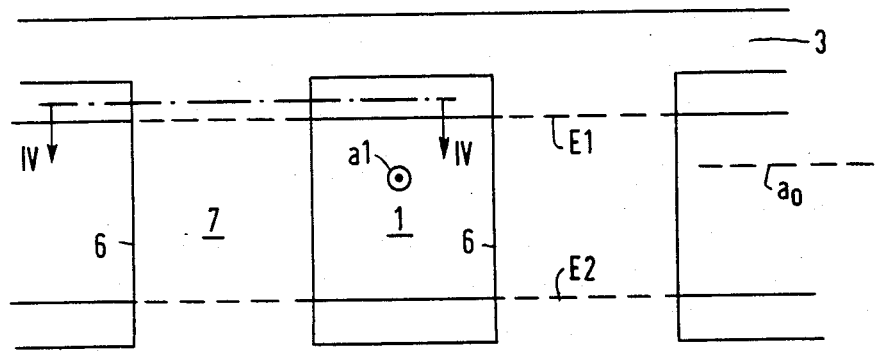
FIG. 3 is a side-elevational view of a laser chamber with window-like housing cutouts for generating a transverse gas flow.
Figure 4:
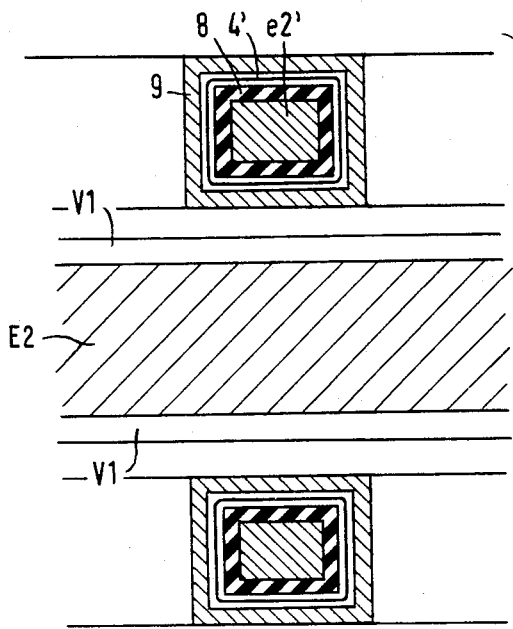
FIG. 4 is a fragmentary, cross-sectional view taken along the line IV—IV of FIG. 3, in the direction of the arrows.

FIGS. 3 and 4 illustrate a different embodiment of the high-energy laser, in which the housing 3 of the laser chamber 1 including the current return is provided with lateral window-like cutouts 6 for allowing a laser gas flow in the direction a₁ transversely to the optical axis a₀ of the laser. As is illustrated particularly in FIG. 4, the metallic current return e2' extending in the core of the remaining housing wall elements 7 is surrounded by a first layer 8 of insulating material. The insulating layer 8 is surrounded by the shield electrodes 4', and the shield electrodes 4' are in turn encapsulated by a second layer of insulating material 9. The empty spaces 3a and the cutouts 5 described in connection with FIG. 1, can be disposed in a similar but non-illustrated manner in this embodiment.

Figure 7:
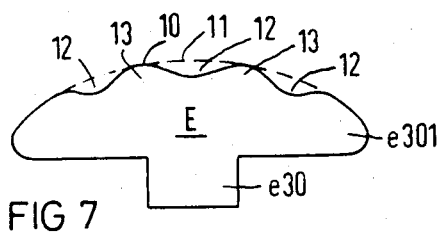
FIG. 7 is a view of a suitable electrode cross-sectional shape for improving the potential conditions.

FIG. 7 shows an electrode profile form, through the use of which the potential conditions can be further improved in cooperation with the shield electrodes 4, 4' of the above-described embodiment examples. Into this electrode, which is shown in part and is generally designated with reference symbol E, several rounded longitudinal slots 12 are worked in the longitudinal direction of the electrode, especially by milling, in a convex surface region 10. The cross section of the surface region 10 is defined by a dotted line Chang or Rogowski profile envelope 11. Between the slots 12, elongated profile humps 13 remain standing. Such a modified Chang or Rogowski profile has the effect of further amplifying the radial field components at the expense of the tangential ones, whereby the shielding effect of the shield electrodes 4 and the effect of the cavities 5 increasing the wave impedance for sliding sparks are aided. The mushroom stem of the electrode E which is preferably formed of a halogen-resistant metal alloy, such as alloy steel or aluminum, is designated with reference symbol e30, and its mushroom head is designated with reference symbol e301. The Chang or Rogowski base profile has been mentioned only as an example; other profile shapes would also be suitable.

The foregoing is a description corresponding to German Application No. P 31 26 375.5, dated July 3, 1981, the International priority of which is being claimed in the instant application, and which is hereby made part of this application. Any discrepancies between the foregoing specification and aforementioned corresponding German application are to be resolved in favor of the latter.

We claim:

1. In a high-energy laser of the TE-type with excitation taking place by an arc-free capacitor discharge being as homogeneous as possible, the improvement comprising a housing having walls formed at least partially of high voltage-resistant insulating material defining a laser chamber having a gas space, at least two first and second electrodes being extended in said laser chamber and surrounded by regions of said housing walls, said electrodes being disposed opposite each other, spaced apart and parallel to the optical axis of the laser, the excitation taking place in said gas space between said electrodes, a preionization device disposed in said laser chamber, a current feed connected to said first electrode, a current return being connected to said second electrode and being in the form of metallic wall portions extended from said second electrode along the outside of said housing of said laser chamber at least to the vicinity of the region of said housing wall surrounding said first electrode, said insulating material of said housing in said gas space between said electrodes and said wall portions of said current return having cavities formed therein on two sides of said first electrode parallel to the optical axis, as seen in direction of the optical axis, shield electrodes being inserted into said cavities and being connected to the potential of said first electrode, said housing of said laser chamber and said current return having lateral window-shaped cutouts formed therein for permitting a laser gas flow transverse to the optical axis and forming remaining housing wall elements with a core in which said metallic current return is disposed, a first layer of insulating material surrounding said metallic current return in said core, said first insulating layer being enclosed by said shield electrodes, and a second layer of insulating material encapsulating said shield electrodes.

2. High-energy laser according to claim 1, wherein said cavities extend beyond the depth of said shield electrodes in direction toward the region of the housing walls surrounding said second electrode.

3. High-energy laser according to claim 1 or 2, wherein said first and second electrodes have bases disposed in said regions of said housing walls surrounding said respective electrodes, and said cavities extend from a location even with said base of said first electrode to a location even with said base of said second electrode.

4. High-energy laser according to claim 1, wherein said cavities have bottoms and said wall portions of said current return have surfaces facing said laser chamber having tray-shaped recesses formed therein extended from a zone in which said shield electrodes overlap said recesses at least to the vicinity of said bottom of said cavities.

5. High-energy laser according to claim 1 or 2, wherein said cavities are in the form of rows of closely adjacent drill holes, and said shield electrodes are in the form of a plurality of metal pins being electrically interconnected and inserted into said drill holes.

6. High-energy laser according to claim 1, wherein said cavities are in the form of a slot-shaped cavity, and said shield electrodes are in the form of sheet metal inserted into said slot-shaped cavity.

7. High-energy laser according to claim 1, wherein said cavities are in the form of a slot-shaped cavity, and said shield electrodes are in the form of a metal screen inserted into said slot-shaped cavity.

8. High-energy laser according to claim 1, wherein said cavities are in the form of longitudinal slots formed in said housing, and said shield electrodes are in the form of wires being stretched taut parallel to the optical axis, said wires being disposed in said longitudinal slots and being connected to said first electrode.

9. High-energy laser according to claim 1, wherein said electrodes have profile envelopes with surface regions having a plurality of rounded longitudinal slots formed therein in lengthwise direction an elongated profile humps remaining between said slots within said profile envelope.

* * * * *